US007150578B2

United States Patent
Porco

(10) Patent No.: US 7,150,578 B2
(45) Date of Patent: Dec. 19, 2006

(54) APPLIANCE MOUNTING BRACKET

(76) Inventor: Carmen R. Porco, 755 Fiero La., Suite G, San Luis Obispo, CA (US) 93401

( * ) Notice: Subject to any disclaimer, the term of this patent is extended or adjusted under 35 U.S.C. 154(b) by 223 days.

(21) Appl. No.: 10/655,189

(22) Filed: Sep. 4, 2003

(65) Prior Publication Data

US 2005/0053422 A1    Mar. 10, 2005

(51) Int. Cl.
F16B 7/06 (2006.01)
F16B 7/10 (2006.01)
F16C 11/00 (2006.01)
E04G 3/00 (2006.01)

(52) U.S. Cl. ............................ 403/60; 403/59; 403/67; 403/72; 403/73; 403/78; 403/83; 403/84; 403/103; 403/108; 403/109.6; 403/148; 403/161; 403/164; 403/165; 403/180; 403/182; 403/184; 403/196; 403/262; 403/379.5; 403/DIG. 9; 248/285.1

(58) Field of Classification Search ................ 403/42, 403/59–60, 63, 64, 67–73, 78–96, 98, 103, 403/108, 109.6, 110, 145, 148, 161, 164, 403/165, 180–184, 196, 262, 287, 373, 379.5, 403/384, 385, 395, DIG. 9; 248/230.5, 231.61, 248/285.1; 362/269, 270, 396, 427, 430; 52/126.6
See application file for complete search history.

(56) References Cited

U.S. PATENT DOCUMENTS

| 3,023,990 | A | * | 3/1962 | Gunthel, Jr. ............... 248/70 |
| 3,937,451 | A | * | 2/1976 | DiPaola et al. ............ 403/385 |
| 4,534,535 | A | * | 8/1985 | Maeda et al. .............. 248/636 |
| 4,671,478 | A | * | 6/1987 | Schoenig et al. ........... 403/297 |
| 4,901,970 | A | * | 2/1990 | Moss et al. ................ 403/385 |
| 5,156,630 | A | * | 10/1992 | Rappoport et al. ......... 403/103 |
| 5,380,117 | A | * | 1/1995 | Buschulte ................ 403/379.5 |
| 5,515,655 | A | * | 5/1996 | Hoffmann ................. 52/126.6 |
| 5,862,635 | A | * | 1/1999 | Linse et al. ............... 52/126.6 |
| 5,975,786 | A | * | 11/1999 | Chang ........................ 403/78 |
| 6,032,993 | A | * | 3/2000 | Kwon ......................... 403/78 |
| 6,158,705 | A | * | 12/2000 | Cudmore et al. .......... 248/354.1 |
| 6,719,255 | B1 | * | 4/2004 | Chen ...................... 248/230.5 |
| 2002/0021572 | A1 | * | 2/2002 | Spring, Jr. ................. 362/396 |
| 2004/0233676 | A1 | * | 11/2004 | Matts et al. ............... 362/427 |
| 2004/0238714 | A1 | * | 12/2004 | Slatter et al. ............ 248/230.5 |

* cited by examiner

Primary Examiner—Daniel P. Stodola
Assistant Examiner—Victor MacArthur
(74) Attorney, Agent, or Firm—Kleinberg & Lerner, LLP; Marvin H. Kleinberg; Marshall A. Lerner

(57) ABSTRACT

A clamp system for attaching accessory devices to a railing structure includes a first clamping jaw member and a second clamping jaw member designed to clamp on a railing structure. An accessory mounting device includes a cylindrical collar portion with a plurality of diametrically aligned holes arranged around the circumference. One of the clamping jaw members has an opening, sized to receive the collar portion and one pair of holes that can be aligned with the holes of the collar portion. When the mounting device is in a desired orientation, a pin is inserted through the aligned holes to hold the orientation. A locking nut is mounted on a threaded portion of the collar portion and, when tightened, tends to withdraw the collar portion against the pin, firmly securing the assembly together.

2 Claims, 2 Drawing Sheets

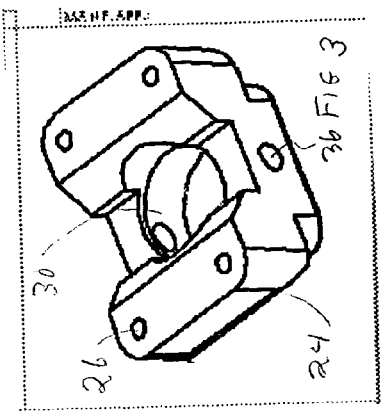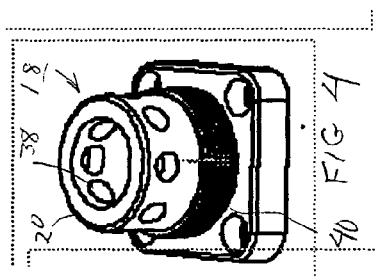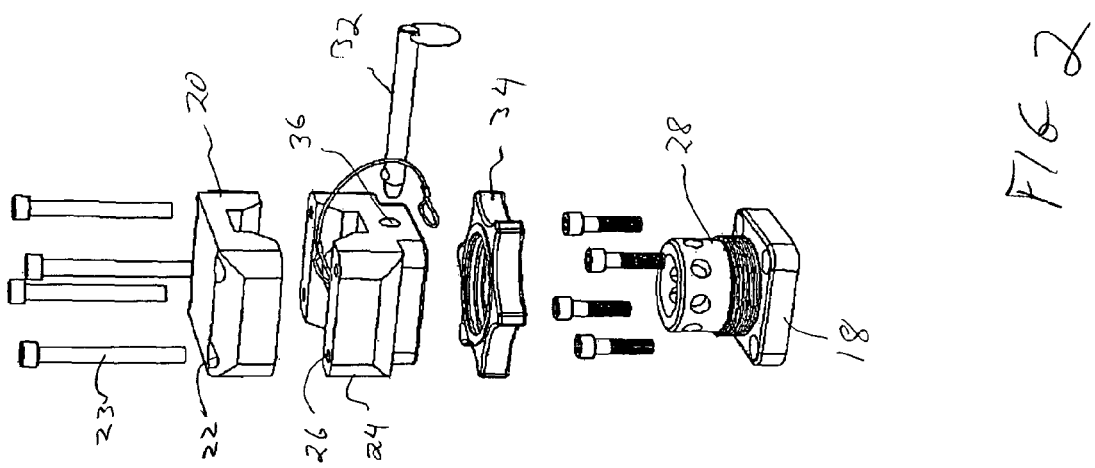

APPLIANCE MOUNTING BRACKET

BACKGROUND OF THE INVENTION

1. Field of the Invention

The present invention relates to brackets for mounting accessory equipment and, more particularly, to a mounting assembly for removably and adjustably attaching an accessory device to a railing.

2. Description of the Related Art

It is well known that various accessory items can be mounted on tubular rails, either in a fixed orientation or in an orientation that may be altered. This, however, can be a problem when dealing with environments of extreme vibration where it is necessary to assure the security of the mounting. For example, marine vehicles, such as motor boats, include accessories such as music systems with loud speakers which are mounted on available railings and which must be capable of orientation for optimum sound, whether toward the cockpit or in some other direction, Typical prior art approaches have used a clamp with a mounting collar for the railing which is connected to the accessory base through a cylindrical post which is held in the collar and secured by set screws. The orientation of the accessory could be set by rotating the base in the collar and tightening the screws.

In operating environments with substantial vibration, set screws tend to loosen, permitting excessive vibration of the accessory and possibly loss of the accessory if mounted on a vehicle which is subject to pitching and sudden vertical motion. For example, in marine environments, a vessel might encounter rough weather in which waves and swells cause sudden changes in attitude and orientation. Similarly, motor vehicles traveling over rough terrain at high speeds would also encounter sudden vertical movements.

It would be desirable to have a combination for mounting accessories which can be adjusted for orientation and then secured in place without concern for the extreme vibration that might be encountered, either from vehicular power trains or from the travel path, itself.

SUMMARY OF THE INVENTION

According to the present invention, an accessory mounting device includes a clamp portion with a circular collar section having an aperture along a diameter of the collar. The accessory mounting portion has a cylindrical base portion that closely fits into the collar. The cylindrical base portion has a plurality of openings through the base portion arranged about the circumference defining a plurality of diameters.

In one embodiment, four such openings are provided in two orthogonal pairs separated by 45°. In the preferred embodiment, the accessory base portion is a hollow post. A locking rod is provided which passes through the opening in the collar and through a selected pair of openings in the hollow post.

The accessory mounting portion also includes a mounting platform set upon the cylindrical base portion. Between the hollow post and the platform is a threaded section upon which is placed a locking nut. When the locking rod fixes the orientation of the platform relative to the clamp, the locking nut can be tightened to prevent vibration as well as exert a force which holds the locking rod in place. With the locking nut tightened, there is little danger that vibrational forces will affect the combination.

It is therefore an object of the invention to provide a accessory mounting assembly which can be azimuthally oriented without change due to vibration or motion.

It is another object of invention to provide an accessory mounting system capable of quick release and separation.

It is a further object of invention to provide an accessory mounting combination that is resistant to vibration or extreme changes in orientation and direction.

The novel features which are characteristic of the invention, both as to structure and method of operation thereof, together with further objects and advantages thereof, will be understood from the following description, considered in connection with the accompanying drawings, in which the preferred embodiment of the invention is illustrated by way of example. It is to be expressly understood, however, that the drawings are for the purpose of illustration and description only, and they are not intended as a definition of the limits of the invention.

BRIEF DESCRIPTION OF THE DRAWINGS

FIG. 2 is an exploded view of the mounting device of FIG. 1;

FIG. 3 is a perspective view of the base clamp of the device of FIG. 2; and FIG. 4 is a perspective view of the mounting portion of the device of FIG. 1.

DESCRIPTION OF THE PREFERRED EMBODIMENTS

Figure 1:
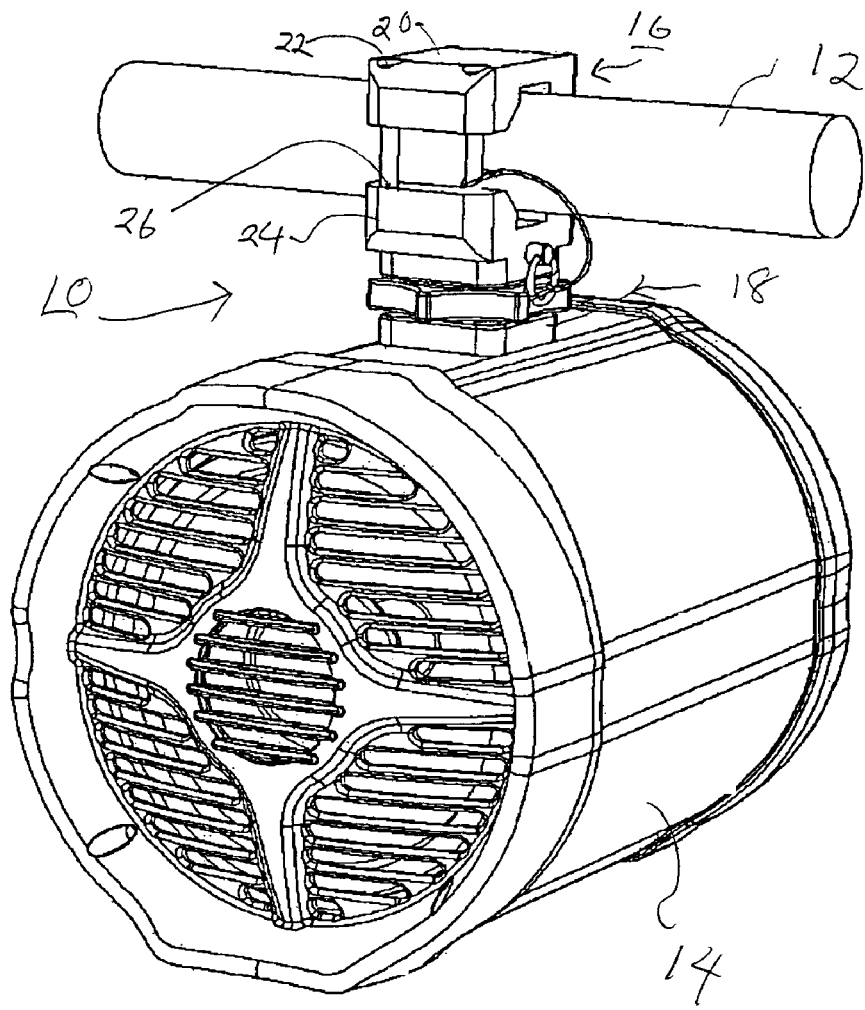
FIG. 1 is a perspective view of a mounting device according to the present invention, attaching a speaker unit to a railing.

Turning first to FIG. 1, there is shown a mounting device 10 affixed to a rail 12 and supporting a speaker unit 14. As shown, the speaker 14 is positioned below the rail 12, but with the mounting device 10 of the present invention, the speaker 14 can be rotated to any position about the rail 12 and fixed in a predetermined number of orientations about an axis that is a radius of the railing 12.

The device 10 includes two major sub components, a clamping portion 16 and a device mounting portion 18. The clamping portion 16 includes an outer clamp element 20 with a plurality of holes 22 drilled to receive coupling bolts 23 (shown in FIG. 2). The clamping portion 16 also has a base clamp element 24 with a plurality of tapped holes 26 into which the coupling bolts are seated.

The mounting portion 18 (best seen in FIG. 4) includes a multi-apertured tube portion 28 which fits within an opening 30 of the base clamp element 24. A pin 32 (shown in place in FIG. 1) holds the mounting portion 18 in a predetermined orientation and a locking nut 34, which is threaded on to the mounting portion 18, applies a force which pulls the tube portion 28 against the pin 32, locking the assembly in place.

FIG. 3 shows the base clamp 24 in perspective so that the opening 30 can be clearly seen. Also in view is an aperture 36 through which the pin 32 is fitted.

FIG. 4 shows, in perspective view, the mounting portion 18. In the preferred embodiment, the tube portion 20 has eight openings 38 equally spaced about the circumference to permit changes in orientation of the mounted device by 45° increments. Also are shown the threads 40 upon which lock nut 34 is fitted.

As can be seen, the outer clamp element 20 includes an interior area which is adapted to accept pipe or tube rails of varying diameters. In the preferred embodiment, the clamping portion 16 of the assembly can accept a rail of different cross sections so long as a cross section dimension varies from 1" to 2". In alternative embodiments, the clamping portions can be sized according to the size of the rail to which it is to be affixed.

In operation, the mounting portion 18 is separated from the clamping portion 16 by removing the pin 32 which permits the removal of the mounting portion 18. A utilization device, for example, a loudspeaker 14 is fastened to the mounting portion 18 by bolts or other fastening devices.

The clamping portion 16 is separated into its component elements, namely the outer and base clamp elements 20, 24. The clamp elements 20, 24 are installed on a rail 12 and the coupling bolts 23 are tightened with the clamping portion 16 firmly fixed in a desir d orientation.

The tube 28 is inserted into the opening 30 in the base clamp 24 and rotated to the desired placement. The pin 32 is inserted in pin aperture 36, through a pair of tube openings 38. The locking nut 34 is then tightened, pulling the mounting portion 18 against the pin 32 for a snug fit.

The utilization device (shown here as a loudspeaker 14) can be easily removed by loosening the locking nut 34 until the pin 32 can easily be withdrawn. The mounting portion 18 with its attached device is then lifted out of the clamping portion 16.

While the present device has been designed for use in a marine environment to mount loudspeakers, it can easily be modified for virtually any application which involves mounting a device to a railing of a variety of cross sectional shapes. Accordingly, the scope of the invention should be limited only by the breadth of the claims appended hereto.

What is claimed as new is:

1. Apparatus for mounting an accessory device comprising:
    a. an outer jaw clamping member;
    b. an inner jaw clamping member adapted to cooperate with said outer jaw clamping member to provide a stable and secure mounting platform for the accessory device, said inner clamping jaw member having a central orifice;
    c. a coupling member adapted to be connected to the accessory device, said coupling member having a collar portion extending therefrom and adapted to fit into said inner jaw clamping member central orifice;
    d. first locking means for securing said collar portion to said inner jaw clamping member including a plurality of first apertures around the circumference of said collar member, a diametrically aligned second aperture in said inner clamping jaw member and a pin member adapted to be inserted through said second aperture and a selected pair of first apertures for fixedly engaging said coupling member in said inner clamping jaw member in a desired orientation; and
    e. second locking means including a threaded outer collar surface of said collar portion and a locking nut mounted on said threaded surface for exerting a withdrawing force on said coupling member.

2. Apparatus for mounting an accessory device to a railing structure comprising:
    a. an outer jaw clamping member;
    b. an inner jaw clamping member adapted to cooperate with said outer jaw clamping member for attaching to the railing structure to provide a stable and secure mounting platform for the accessory device, said inner clamping jaw member having a central orifice with an axis substantially orthogonal to the railing structure;
    c. a coupling member adapted to be connected to the accessory device, said coupling member having a collar portion extending therefrom and adapted to fit into said inner jaw clamping member central orifice;
    d. first locking means for securing said collar portion to said inner jaw clamping member, including a plurality of first apertures around the circumference of said collar member, a diametrically aligned second aperture in said inner clamping jaw member and a pin member adapted to be inserted through said second aperture and a selected pair of first apertures for fixedly engaging said coupling member in said inner clamping jaw member in a desired orientation relative to the railing structure; and
    e. second locking means including a threaded outer collar surface on said collar portion and a locking nut mounted on said threaded surface for exerting a withdrawing force on said coupling member.

* * * * *